United States Patent Office 3,084,091
Patented Apr. 2, 1963

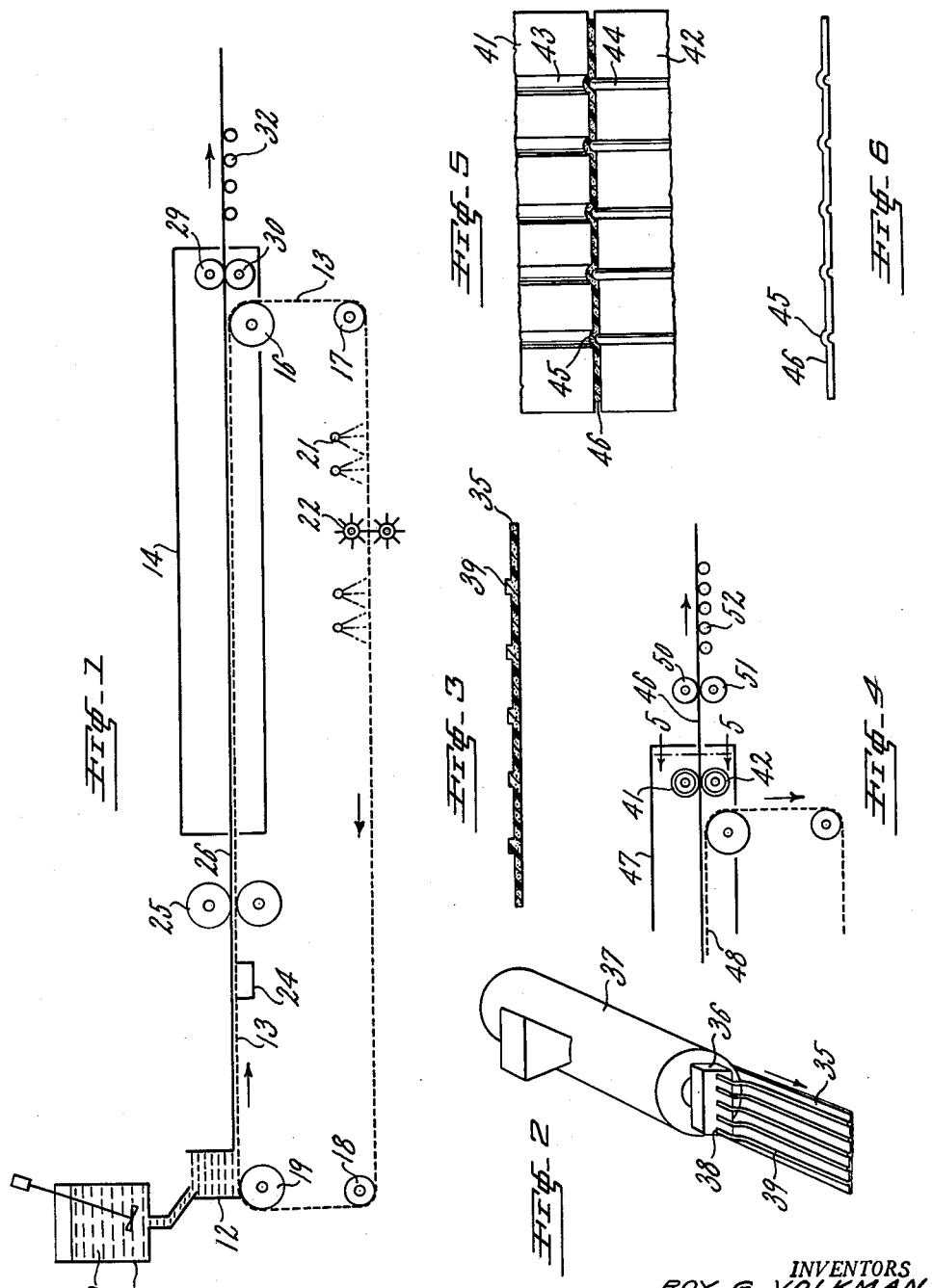

3,084,091
METHOD OF MAKING BATTERY SEPARATOR
FROM PLASTIC ENCAPSULATED FIBERS
Roy G. Volkman, Warwick, and Wong Ting Theung, Providence, R.I., assignors to United States Rubber Company, New York, N.Y., a corporation of New Jersey
Filed Mar. 4, 1960, Ser. No. 12,725
10 Claims. (Cl. 162—103)

This invention relates to a microporous material, and to a method of making the same. More particularly the invention relates to a microporous structure comprising plastic-encapsulated cellulosic fibers, and to a process of making such microporous structure involving forming a mat or sheet of the fibers, and fusing such sheet.

A principal object of the invention is to provide an economical and convenient way of making microporous battery plate separators for electric storage batteries, especially of the lead-acid type.

Another object is to provide a means for making battery plate separators from plastic-encapsulated cellulosic fibers which contain porosity sufficient to allow ready passage of battery electrolyte, but at the same time enabling good strength to be developed.

Still another object of the invention is to provide an improved spacing rib structure on a battery separator, either by applying additional rib-forming material to a flat sheet, or by providing embossed ribs directly in the sheet during the original processing of the sheet.

Still another object is the provision of a method of making battery separators which can be carried out rapidly and continuously, without any necessity for performing time-consuming discontinuous molding operations.

Yet another object is to achieve rapidly and uniformly a critical balance between sufficient fusing of the sheet to provide high strength, while retaining sufficient porosity to provide low electrical resistivity.

It is still a further object of the invention to provide a method of fusing thermoplastic fibrous material to form a sheet in such a manner that high porosity is maintained, even at the surface, while fusing the mass sufficiently to form a strong, integral body.

Further objects and advantages of the invention will be made manifest in the following detailed description, which is intended to be read with reference to the accompanying drawing, wherein:

FIG. 1 is a diagrammatic longitudinal elevational view of an apparatus suitable for carrying out the invention;

FIG. 2 is a fragmentary perspective view showing a method of applying ribs to the battery separator of the invention;

FIG. 3 is an enlarged transverse sectional view of a ribbed battery separator of the invention;

FIG. 4 is a fragmentary view, similar to FIG. 1, of an apparatus suitable for use in a modification of the invention;

FIG. 5 is an enlarged transverse view taken along the line of 5—5 of FIG. 4; and, FIG. 6 is an enlarged transverse sectional view of an embossed battery separator of the invention.

The invention utilizes plastic-encapsulated cellulosic fibers of the kind described in Belgian Patents No. 575,559, filed February 10, 1959, and No. 576,208, filed February 27, 1959, in the name of National Lead Co. Such encapsulated fibers are made, as described in the Belgian patents, by treating cellulosic fibers, such as wood flour or flock, or cotton linters, with catalytic materials such as titanium tetrachloride in conjunction with methyl magnesium bromide, and polymerizing on the catalyst-treated fibers a monoolefinic unsaturated monomer which is usually an olefin such as ethylene or propylene, but may also be any other polymerizable olefinically unsaturated monomer, such as styrene. The encapsulated fibers are by nature hydrophobic. The Belgian patents refer to the preparation of a battery separator from such plastic-encapsulated fibers by a method involving pressing a sheet of such fibers in a heated mold. However, such method does not in general provide a product having the desired strength in combination with low electrical resistivity nor is such prior method adapted to be carried out rapidly and economically. One reason for this appears to be that pressing a sheet of the fibers in a heated mold merely results in fusion of the fibers at the surface of the sheet, without appreciable change in the interior of the sheet, since the heat conductivity of the material is extremely low. On the other hand, if it is attempted to heat the interior adequately by increasing the heat to the mold or by leaving the material in the mold for a long time, the tendency is for the surface of the sheet to become overheated and glazed, and because of the mechanical pressure coupled with high surface temperature there is formed a surface skin which acts as a barrier to the passage of an electrolyte. The invention avoids these difficulties and disadvantages by carrying out the fusion in two distinct stages, the first at atmospheric pressure, and the second by pressing between unyielding surfaces maintained below the melting point of the plastic.

In accordance with the invention a sheet or mat of the plastic-encapsulated fibers is deposited from a slurry of such fibers on a foraminous travelling conveying means, suitably with the aid of conventional paper making equipment, and the sheet while supported on such conveying means is heated to a temperature in excess of the melting point of the plastic without mechanical compression so that the plastic-encapsulated fibers fuse to each other at their points of contact without loss of porosity, thus forming an integral but highly porous sheet. It is surprisingly found that this sheet is self-supporting even at temperatures in excess of the melting point of the plastic, so that the sheet can be removed in the hot condition from the conveying means without tearing or disrupting of its own weight. The operability of the present process appears to be directly related to this remarkable and unexpected ability of the porous sheet of fibers, when processed as described, to remain as an integral sheet, in the absence of extraneous support, at temperatures in excess of the melting point of the plastic, even when appreciable tension is applied to the hot sheet to separate it rapidly from the conveying means and to advance it continuously into the next stage of the process. In the next stage of the process, the thus partially fused sheet, still at a temperature in excess of the melting point of the plastic, is drawn continuously into the nip of a pair of driven, carefully spaced rolls, which are maintained at an elevated temperature below the melting point of the plastic. This brings about a greater degree of fusion of the plastic-encapsulated fibers but does not destroy the porosity of the sheet. Cooling of the sheet "freezes" it in the desired condition and it is subsequently cut to proper size for a battery separator.

The preferred material for use in practicing the invention is polyethylene encapsulated wood fiber. Such a material, made by polymerizing ethylene on about an equal quantity of a commercial wood flour (known as "Solka Floc" consisting of wood fibers approximately 160 microns in length, supplied by Brown Co.), is supplied under the name "Nalcon" fibers by National Lead Co.

In practicing the invention the plastic-encapsulated fibers are dispersed in water to form a slurry usually containing from 0.1 to 1.0% solids, and more preferably containing from 0.3 to 0.5% solids. Referring to the drawing, such slurry 10 may suitably be contained in a supply tank 11 from which it is fed to a head box 12 of a Fourdrinier or similar paper making machine. The apparatus includes an endless travelling foraminous conveying means, suitably a fine mesh (e.g., 150 mesh) wire screen 13 which has been lengthened considerably in comparison to the length used in an ordinary paper making machine, so as to pass through a long heated oven 14. The screen 13 then returns, around a series of drums or guide rolls 16, 17, 18 and 19 (at least one of which is driven by suitable means not shown) to the head box 12. An arrangement of water sprays 21 and revolving brushes 22 serves to clean the screen on its return travel.

The screen 13 advances across the open bottom of the head box 12, as in conventional paper making practice, in such manner that the plastic-encapsulated fibers are deposited from the slurry onto the screen, and upon removal of the bulk of the water, as the screen passes in engagement with a conventional suction box 24 and suction roll 25 arrangement, a mat or sheet 26 of felted fibers is thus formed.

It will be understood that in the sheet as thus deposited the fibers are disposed in essentially random fashion in a rather loosely matted condition, with the fibers touching each other only at spaced points. The sheet or mat is therefore highly porous, the pores of course being represented by the spaces between the fibers, which form an interconnecting microporous labyrinth.

The sheet 26, still containing considerable moisture, passes into the oven 14 wherein it is subject to a forced current of hot air supplied by suitable conventional means (not shown), in such manner that the hot air impinges on the deposited sheet at a velocity not in excess of 200 feet per minute to avoid disrupting the sheet. The temperature in the oven is in excess of the softening range or melting point of the plastic, and in fact the oven is maintained as hot as possible, without setting fire to the sheet. The ignition temperature of the sheet is the limiting factor on the maximum temperature employed in the oven. At a temperature of 500° F. the sheet may tend to ignite within about 45 seconds, but at a temperature of 450° F. it usually takes about 1½ minutes for the sheet to ignite, when using typical polyethylene encapsulated wood flour fibers. A preferred operating condition contemplates passage of the sheet through an oven about 150 feet long in about 1½ minutes, the maximum temperature in the oven being about 450–500° F. so that the actual temperature of the sheet does not exceed 450° F. for a period of time sufficient to catch fire. It will be understood that since the sheet enters the oven in a moist condition, it does not attain essentially the temperature of the oven atmosphere until the water has evaporated, so that the sheet itself is not at the same temperature as the oven during its entire time of dwell in the oven.

The polyethylene plastic on the typical encapsulated fibers employed in the invention has a softening temperature or melting point in the neighborhood of about 315° F. It will be understood that the plastic does not melt sharply at a definite temperature, but rather it softens progressively over a range of temperatures. However, a temperature of about 315° F. may be said to be the approximate softening or fusing temperature of the typical plastic employed, since at this temperature the plastic has essentially no strength and will flow of its own weight or under slight pressure In the practice of the invention the oven temperature is maintained in any case at least as high as 330° F., and preferably at least 350° F., and more preferably much higher (400° F. or more), up to a limiting value of about 450–500° F., to bring about rapid drying and ready fusion of the sheet as it passes through the oven, preferably at a rate of at least 50 feet per minute, and typically at least 100 feet per minute, or even as high as 200 or more feet per minute.

The sheet attains in the oven a temperature sufficiently elevated to melt the plastic, with the result that the encapsulated fibers fuse or merge with each other at their natural points of contact, thus forming an integral sheet. An important feature of the invention is that such fusion takes place at this stage without externally applied pressure, that is, without any compression of the sheet. Such fusion is referred to as partial fusion because it represents only a limited integration of the sheet and the original degree of porosity of the sheet is not substantially decreased at this stage.

The sheet as thus partially fused without compression typically has a thickness of about 0.05 to 0.2 inch, preferably about 0.1 inch, and a porosity of about 85–95%, that is, about 85–95% of the volume of the sheet is empty space and the remaining 15–5% is plastic encapsulated fiber.

A pair of carefully spaced driven pull rolls 29, 30 are disposed inside the oven at the exit end thereof in proximity to and in alignment with the wire screen 13 as it passes onto the driven deturn drum 16. The pull rolls rotate toward each other at a peripheral speed equal to the linear speed of advancement of the wire screen 13 in such manner as to pull the sheet 26 off the surface of the wire screen and draw the sheet under tension into the nip or carefully predetermined space between the rolls.

The pull rolls are provided with means (not shown) for circulating within their interiors a temperature control medium such as water or steam, in such manner that the surface temperature of the rolls is maintained just below the melting point of the plastic, say at a temperature about 5° to 20° below the melting point of the plastic. Using the typical polyethylene encapsulated fibers, the temperature of the pull rolls is usually maintained at about 275–310° F., preferably about 300° F. It will be noted that this is considerably below the general temperature maintained in the oven.

The spacing of the pull rolls is substantially less than the thickness of the partially fused sheet as it leaves the wire screen. The ratio of the thickness of the partially fused sheet and the spacing between the pull rolls is usually within the range between 2:1 and 4:1 and is typically about 3:1. The heated sheet is therefore compressed and densified, without formation of surface "skin," as it passes between the pull rollers. As a result of this action the number of contact points between the plastic-encapsulated fibers is increased and since the sheet enters the spacing between the pull rolls substantially at oven temperature, that is, at a temperature greatly in excess of the softening point of the plastic, the plastic-encapsulated fibers fused together or merge at the adidtional points of contact. This step is referred to as a completion of the fusion of the sheet, with compression, and it greatly increases the strength of the final sheet, but at the same time the degree of densification is carefully regulated, by proper spacing of the pull rollers, so that the desired substantial porosity, with consequent low electrical resistivity, remains. The porosity of the typical completely fused and compressed sheet material made in this manner is usually about 60–65% and the sheet usually has a thickness of about 0.04 to 0.02 inch, preferably about 0.03 inch.

The importance of maintaining the pull rolls at a temperature just below the softening point of the plastic resides in the fact that the surface of the sheet as it passes through the rolls thereby tends to remain quite open, that is, it does not tend to become glazed over with a film of plastic that might otherwise block off a substantial number of surface entrances to the pores of the sheet. Because of the relatively cooler surfaces of the pull rolls the sheet also tends to become essentially fixed so that the form of the sheet is essentially stabilized as the condensed sheet emerges from the pull rolls. At the same time, the pull rolls are not so cold as to interfere with the desired completion of the fusion and compression within the body of the sheet.

The now completely fused and compressed sheet quickly passes from between the pull rolls and immediately emerges from the oven into the ambient atmosphere, which is so cold in comparison to the temperature of the oven, and so far below the softening point of the plastic, that the plastic quickly "freezes" in essentially the size and shape imparted.

The sheet thereafter passes onto a suitable conveyor, such as an arrangement of driven rollers 32, whence it may be delivered to conventional trimming and cutting devices for cutting the sheet into a size suitable for battery separators.

The invention further contemplates the provision of protecting spacing means on at least one surface of the battery separator. In accordance with one embodiment of the invention, as represented in FIG. 2, a strip 35 of microporous sheet material made in the manner described is passed in proximity to a die 36 of a conventional heated plastic extrusion device 37. The die 36 is has a multiplicity of openings 38, from which molten polyethylene emerges in the form of a plurality of thin streams or ribbons 39, which are thus deposited in parallel lines on the surface of the microporous strip 35. The temperature of the polyethylene emerging from the extrusion die is approximately 600° F., and therefore the extruded polyethylene contains sufficient latent heat to fuse with the polyethylene coating on the fibers of the sheet 35.

As shown in FIG. 3, the finished separator has the appearance of a thin sheet 35 to which a plurality of solid ribs 39 have been fused on one surface in the manner described. The ribs may similarly be formed of plastisol composition or the like, as described in copending application Serial No. 718,110 of Sillcox and Witt, filed February 26, 1958, now U.S. Patent No. 2,936,328.

In accordance with a preferred modification of the invention, the separator is provided with embossed ribs in the first instance, instead of being made in the form of a flat sheet to which ribs are applied. Such modification is illustrated in FIGS. 4 and 5, which show modified pull rolls 41, 42 the surfaces of which are provided with cooperating oppositely disposed annular grooves 43 (FIG. 5) and ridges 44, which serve to emboss ribs 45 on the sheet 46 as it passes through the pull rolls. The spacing, temperature and manner of operation of the embossing pull rolls 41, 42 are otherwise the same as those of the flat-surfaced pull rolls 29, 30 previously described. Thus, the embossing pull rolls 41, 42 are located toward the exit end of a similar heated oven 47, and the partially fused sheet 46 is pulled off a continuous wire conveyor 48 by the embossing pull rolls, which complete the fusion and partially compress the sheet to an exact, predetermined extent, all as described above. In this modification the apparatus suitably further includes an additional pair of unheated driven rolls 50, 51 which have flat surfaces and which are located outside but in proximity to the oven. These cold rolls are adjustably spaced, and receive the embossed sheet while it is still warm enough to be reshaped at least slightly by application of pressure. The rolls rotate at a peripheral speed equal to the speed of advancement of the embossed sheet and they are set at a spacing corresponding to the finally desired height of the embossed ribs 45. They thus serve to control and to vary the height of the ribs to any desired height less than their height as originally embossed by the embossing pull rollers 41, 42. The cold rolls 50, 51 do not change the porosity of the sheet. The sheet finally passes on to a conveyor 52 where it may be further cooled by cold water or air, and whence it is delivered to conventional equipment for trimming and cutting.

It is important to note that when an embossed battery separator of the kind described is desired, the embossing must be carried out contemporaneously with the completion of fusion and the densification in the pull rolls. The separator cannot be fused and compressed in the form of a flat sheet and thereafter embossed. Rather, the embossing must be effected while the final fusion and compression is taking place.

Typical battery separators made in this manner have a wetting time of 200–2000 seconds, and a Mullen burst strength of 18–20 pounds.

It will be apparent from the foregoing that the invention provides an improved method of manufacturing microporous battery separators of high quality in a rapid and economical fashion. The method is particularly well adapted to being carried out continuously, and enables the production of improved battery separators in a remarkably short time.

An advantageous feature of the invention resides in the manner in which the initially deposited sheet of plastic-encapsulated fibers is first partially fused without compression to yield a sheet which is strong enough, even at temperatures in excess of the softening temperature of the plastic, to be pulled under tension from its temporary supporting means and advanced rapidly into a device for completing the fusion and compressing the sheet. Another advantageous feature of the invention resides in the simultaneous completion of the fushion and compression of the sheet to an exact desired extent, between the surfaces of cooperating rotating rollers which are temperature controlled in such manner that the surface of the sheet does not become glazed over, and the sheet is quickly fixed in precisely the desired thickness.

It is also desired to emphasize that the invention makes possible the production of an economical embossed separator using the preferred procedure described, as well as a separator initially formed as a flat sheet and having added-on spacing ribs.

The battery separator made in this manner is remarkable for its unusually low electrical resistivity, which is in large part a consequence of the relatively open, porous condition provided at the surface by the method described.

Having thus described our invention, what we claim and desire to protect by Letters Patent is:

1. A method of making a microporous battery separator comprising preparing an aqueous slurry of plastic-encapsulated fibers, causing such slurry to flow onto an advancing conveying means, whereby a thin layer of plastic-encapsulated fibers is deposited on such conveying means, the said conveying means serving as a temporary support for the resulting sheet of fibers, squeezing excess water out of the sheet of fibers, passing the thus-supported sheet through a zone maintained at a temperature of from 330° to 500° F. to remove the remaining water and partially fuse the plastic coating on the fibers without compressing the sheet, pulling the sheet from the conveying means under tension into the nip of spaced pinch rolls heated to a temperature slightly below the melting point of the plastic whereby the sheet is compressed to a desired thickness and the plastic coating on the fibers is further fused to form a strong, integral sheet, and thereafter cooling the sheet.

2. A method as in claim 1 in which strips of molten polyethylene are extruded at an elevated temperature onto a surface of the microporous sheet, whereby such strips become heat-welded to the sheet by reason of the latent heat of the extruded polyethylene, thereby providing spacer ribs on at least one surface of the sheet.

3. A method as in claim 1, in which the said driven pinch rolls serve to emboss the sheet to form spacing ribs as the sheet is compressed and further fused.

4. A method of making a sheet of microporous material comprising preparing an aqueous slurry of polyethylene plastic-encapsulated cellulosic fibers, causing such slurry to flow onto an advancing conveying means, whereby a thin mat of plastic-encapsulated fibers is deposited on such conveying means, the said conveying means serving as a temporary support for the resulting mat of fibers, passing the thus-supported mat through a zone maintained at a temperature which is substantially in excess of the softening temperature of the plastic and which is within the range from 350° to 500° F. without pressing the mat, to partially fuse the plastic coating on the fibers without compressing the mat, pulling the thus-heated mat from the conveying means under tension into the nip of spaced pinch rolls maintained at a temperature below the softening temperature of the plastic, the ratio of the thickness of the mat to the spacing between the pinch rolls being within the range from 2:1 to 4:1, whereby the mat is compressed to a desired thickness and the plastic coating on the fibers is further fused to form a strong integral microporous sheet as it passes between the pinch rolls, without formation of a glazed surface on the resulting microporous sheet, and thereafter cooling the sheet.

5. A method as in claim 4 in which strips of molten polyethylene are extruded at an elevated temperature onto a surface of the microporous sheet, whereby such strips become heat-welded to the sheet by reason of the latent heat of the extruded polyethylene, thereby providing spacer ribs on at least one surface of the sheet.

6. A method as in claim 5, in which the said driven pinch rolls serve to emboss the mat to form spacing ribs as the sheet is compressed and further fused.

7. A method of making a microporous battery plate separator comprising preparing a slurry of polyethylene plastic-encapsulated wood fibers in water, the said polyethylene plastic having a softening temperature of about 315° F., causing such slurry to flow onto an advancing foraminous conveying means, whereby a thin porous sheet of plastic-encapsulated fibers is deposited on such conveying means, the said conveying means serving as a temporary support for the resulting sheet of fibers, passing the thus-supported sheet through a zone maintained at a temperature which is substantially in excess of the said softening temperature of the plastic and which is within the range from 400° to 500° F. without pressing the sheet, to partially fuse the plastic coating on the fibers without compressing the sheet, removing the thus-heated porous sheet from the conveying means and advancing the sheet, at a temperature of about 400°–500° F., into the nip of spaced pinch rolls heated to a temperature of about 275° to 310° F., the ratio of the thickness of the sheet to the spacing between the pinch rolls being about 3:1, whereby the sheet is compressed to a desired thickness and a strong, integral structure of desired microporosity is formed without undesirable glazing over of the surface of the sheet, thereafter cooling the sheet and cutting the sheet to battery separator size.

8. A method of making a microporous battery separator comprising preparing a slurry of polyethylene plastic-encapsulated wood fibers in water, the said polyethylene plastic having a softening temperature of about 315° F., depositing the slurry on an advancing foraminous conveying means to form a thin porous sheet, the said conveying means serving as a temporary support for the sheet, mechanically removing excess water from the sheet, passing the thus-supported sheet through an oven maintained at a temperature which is substantially in excess of said softening temperature and which is within the range from 400° to 500° F., without applying pressure to the sheet, to complete the drying of the sheet and to partially fuse the plastic without compressing the sheet, removing the thus-heated porous sheet from the conveying means while the sheet is still heated to a temperature of 400°–500° F. and advancing the thus-heated sheet into a nip defined between two pinch rolls heated to a temperature of about 300° F., the ratio of the thickness of the sheet to the spacing between the pinch rolls being between 2:1 and 4:1, whereby the sheet is compressed to a desired thickness and an integral sheet of desired microporosity of 60–65% is formed without undesirable glazing over of the surface of the sheet, thereafter cooling the sheet and cutting the sheet to battery separator size.

9. A method as in claim 8, in which strips of molten polyethylene at a temperature of about 500° F. are deposited onto a surface of the finished sheet, whereby such strips become heat-welded to the sheet by reason of latent heat of the extruded polyethylene, thereby providing spacer ribs on at least one surface of the sheet.

10. A method of making a microporous battery separator comprising preparing a slurry of polyethylene plastic-encapsulated wood fibers in water, the said polyethylene plastic having a softening temperature of about 315° F., depositing the slurry on an advancing foraminous conveying means to form a thin porous sheet, the said conveying means serving as a temporary support for the sheet, mechanically removing excess water from the sheet, passing the thus-supported sheet through an oven maintained at a temperature which is substantially in excess of said softening temperature and which is within the range from 400° to 500° F., without applying pressure to the sheet, to complete the drying of the sheet and to partially fuse the plastic without compressing the sheet, removing the thus-heated porous sheet from the conveying means while the sheet is still heated to a temperature of 400°–500° F. and advancing the thus-heated sheet into a nip defined between two pinch rolls heated to a temperature of about 300° F., the ratio of the thickness of the sheet to the spacing between the pinch rolls being between 2:1 and 4:1, the pinch rolls being provided with rib-embossing means, whereby the sheet is simultaneously embossed and compressed to a desired thickness and an integral sheet having embossed ribs is formed without undesirable glazing over the surface of the sheet, thereafter passing the sheet through cold rolls of predetermined spacing to adjust the height of the embossed ribs to a desired value, subsequently cooling the sheet and cutting the sheet to battery separator size.

References Cited in the file of this patent

UNITED STATES PATENTS

| | | |
|---|---|---|
| 2,374,540 | Hall | Apr. 24, 1945 |
| 2,430,868 | Francis | Nov. 18, 1947 |
| 2,482,062 | Hanson | Sept. 13, 1949 |
| 2,739,058 | O'Flynn | Mar. 20, 1956 |
| 2,973,398 | Hubbard et al. | Feb. 28, 1961 |
| 2,978,529 | Brisley et al. | Apr. 4, 1961 |

FOREIGN PATENTS

| | | |
|---|---|---|
| 717,814 | Great Britain | Nov. 3, 1954 |
| 816,867 | Great Britain | July 22, 1959 |